(12) United States Patent
Fujita (10) Patent No.: US 6,522,623 B1
(45) Date of Patent: Feb. 18, 2003

(54) RECORDING DISK CARTRIDGE

(75) Inventor: Minoru Fujita, Ibaraki-ken (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/478,365

(22) Filed: Jan. 6, 2000

(30) Foreign Application Priority Data

Jan. 14, 1999 (JP) .......................................... 11-007242

(51) Int. Cl.$^7$ ................................................. G11B 3/70
(52) U.S. Cl. ..................................................... 369/291
(58) Field of Search ............................. 369/77.1, 77.2, 369/291, 289

(56) References Cited

U.S. PATENT DOCUMENTS

| | | | | |
|---|---|---|---|---|
| 5,276,675 A | * | 1/1994 | Wanger et al. ............... | 369/291 |
| 5,317,467 A | * | 5/1994 | Kato et al. ................... | 360/133 |
| 5,448,553 A | * | 9/1995 | Suzuki et al. ................ | 369/290 |
| 6,046,976 A | * | 4/2000 | Arai et al. .................... | 369/291 |
| 6,172,962 B1 | * | 1/2001 | Goto et al. ................... | 369/291 |

FOREIGN PATENT DOCUMENTS

| | | |
|---|---|---|
| JP | 61-83174 | 6/1986 |
| JP | 64-030068 | 1/1989 |
| JP | 02-123583 | 11/1990 |
| JP | 07-017590 | 1/1995 |
| JP | 08-133374 | 5/1996 |
| JP | A-11213596 | 8/1999 |
| JP | P2997468 | 10/1999 |

* cited by examiner

*Primary Examiner*—George J. Letscher
(74) *Attorney, Agent, or Firm*—Birch, Stewart, Kolasch & Birch LLP (57) ABSTRACT

In a disk cartridge, a holder engagement portion of a disk holder engages with a holder engagement portion of a cartridge case to determine a positional relationship between the cartridge case and the disk holder when the disk holder is inserted into the cavity, a case interference portion of the case engagement portion and a holder interference portion of the holder engagement portion are prevented from being aligned with each other in the inserting direction and interfering with each other when both positional relationship and attitudinal relationship between the disk holder and the cartridge case are maintained at their respective desirable situations for enabling the disk holder to be inserted into the cavity, and the case interference portion and the holder interference portion are aligned with each other to interfere with each other so that the disk holder is prevented from being inserted into the cavity when the attitudinal relationship between the disk holder and the cartridge case is substantially reversed from the desirable situation thereof as seen in the inserting direction and the positional relationship between the disk holder and the cartridge case is maintained at the desirable situation thereof as seen in the inserting direction.

9 Claims, 11 Drawing Sheets

↑ INSERTING DIRECTION

↑ INSERTING DIRECTION

INSERTING DIRECTION

RECORDING DISK CARTRIDGE

BACKGROUND OF THE INVENTION AND RELATED ART STATEMENT

The present invention relates to a recording disk cartridge for containing therein a recording disk, for example, an optical recording disk.

A prior art recording disk cartridge as disclosed by JP-A-11-213596 comprises a disk holder for holding thereon a recording disk, and a cartridge case for receiving therein the disk holder with the recording disk so that the recording disk is inserted into the cartridge case while the recording disk is held on the disk holder.

OBJECT AND SUMMARY OF THE INVENTION

An object of the present invention is to provide a recording disk cartridge for containing therein a recording disk, into which recording disk cartridge, the recording disk is inserted while an attitudinal relationship between the recording disk and the recording disk cartridge is surely kept errorlessly or correctly, and is prevented from being inserted when the attitudinal relationship between the recording disk and the recording disk cartridge is in error or reversed from the correct attitudinal relationship therebetween.

A recording disk cartridge for containing therein a recording disk, comprising, a disk holder adapted to hold therein the recording disk, and a cartridge case for containing therein the disk holder, having a cavity into which the disk holder is capable of being inserted in an inserting direction, wherein the cartridge case includes a case engagement portion, the disk holder includes a holder engagement portion, the case engagement portion and the holder engagement portion engage each other to determine a positional relationship between the cartridge case and the disk holder as seen in the inserting direction when the disk holder is inserted into the cavity, the case engagement portion includes a case interference portion, the disk holder includes a holder interference portion, the case interference portion and the holder interference portion are arranged to be prevented from being aligned with each other in the inserting direction and interfering with each other when both positional relationship and attitudinal (angular) relationship between the disk holder and the cartridge case as seen in the inserting direction are maintained at their respective desirable situations for enabling the disk holder to be inserted into the cavity in the inserting direction, and the case interference portion and the holder interference portion are arranged to be aligned with each other to interfere with each other so that the disk holder is prevented from being inserted into the cavity in the inserting direction when the attitudinal (angular) relationship between the disk holder and the cartridge case is substantially reversed from the desirable situation thereof as seen in the inserting direction and the positional relationship between the disk holder and the cartridge case is maintained at the desirable situation thereof as seen in the inserting direction. That is, the interference between the case interference portion and the holder interference portion performs a prevention of undesirable reversed insertion of the disk holder into the cartridge case while desirable insertion of correct attitude of the disk holder into the cartridge case is kept possible.

Since the case interference portion and the holder interference portion are arranged on the cartridge case and the disk holder to be prevented from being aligned with each other in the inserting direction and from interfering with each other when both positional relationship and attitudinal (angular) relationship between the disk holder and the cartridge case as seen in the inserting direction are maintained at their respective desirable situations for enabling the disk holder to be inserted into the cavity in the inserting direction, and the case interference portion and the holder interference portion are arranged on the cartridge case and the disk holder to be aligned with each other to interfere with each other so that the disk holder is prevented from being inserted into the cavity in the inserting direction when the attitudinal relationship between the disk holder and the cartridge case is substantially reversed from the desirable situation thereof as seen in the inserting direction and the positional relationship between the disk holder and the cartridge case is maintained at the desirable situation thereof as seen in the inserting direction, the disk holder is prevented from being inserted into the cartridge case when the attitudinal relationship between the disk holder and the cartridge case is substantially reversed from the desirable situation thereof as seen in the inserting direction for enabling the disk holder to be inserted into the cavity in the inserting direction.

If the case engagement portion includes side walls extending in a thickness direction of the recording disk as seen in the inserting direction, and bridge walls bridging the side walls in a direction perpendicular to the thickness direction as seen in the inserting direction to form the cavity, and the case interference portion is formed on at least one of the side walls, a rigidity of the case interference portion is maintained high because a rigidity of the side walls is significantly higher than that of the bridge walls. A length of the bridge walls in the direction perpendicular to the thickness direction as seen in the inserting direction is significantly larger than that of the side walls in the thickness direction of the recording disk as seen in the inserting direction.

The holder engagement portion includes side surfaces at which the holder engagement portion terminates in a direction perpendicular to a thickness direction of the recording disk as seen in the inserting direction. The side surfaces extend parallel to the inserting direction. Furthermore, the holder interference portion is formed on at least one of the side surfaces. In addition, the rigidity of the case interference portion can be maintained high because the rigidity of the side walls is significantly higher than that of the bridge walls.

It is preferable for increasing further the rigidity of the case interference portion that a thickness of each of the side walls in a direction perpendicular to the recording disk thickness direction is larger than that of each of the bridge walls in the direction as seen in the inserting direction. The case interference portion may be a protrusion protruding into the cavity as seen in the inserting direction. The holder interference portion is a protrusion protruding on the disk holder in a direction perpendicular to a thickness direction of the recording disk as seen in the inserting direction. The protrusion may be stair-shaped.

When the cartridge case includes first and second sides juxtaposed with each other along an imaginary plane (preferably passing a substantially center position of the cartridge case in the recording disk thickness direction) perpendicular to a thickness direction of the recording disk as seen in the inserting direction, the case interference portion may be formed on one of the first and second sides. When the disk holder includes first and second sides juxtaposed with each other along an imaginary plane (preferably passing a substantially center position of the disk holder in the recording disk thickness direction) perpendicular to a thickness direction of the recording disk as seen in the inserting direction, the holder interference portion may be formed on one of the first and second sides.

It is preferable for maintaining in a long term correctly a force for supporting the recording disk on the disk holder that the disk holder includes at least three contact points for contacting a radially outer periphery of the recording disk to hold the recording disk, at least one of the contact points urges radially inward the radially outer periphery, and the disk holder further includes a metallic spring for generating a radially inward urging force applied to the radially outer periphery through at least one of the contact points. The metallic spring may be plate-shaped. The urging force generated by the metallic spring is prevented from being applied to the radially outer periphery to release the recording disk so that the recording disk can rotate freely when the disk holder is set at a predetermined position in the cavity or sufficiently deeply inserted into the cavity.

The disk holder is preferably made of a composite material including a synthetic resin and fiber. The disk holder may comprise a pair of elastic cantilever-shaped arms for holding the recording disk therebetween. The fiber may include at least one selected from a group of glass-fiber, carbon-fiber, boron-fiber and organic fiber. The synthetic resin may include at least one selected from a group of polyamideimide resin, polyamide resin, polyphenylene-sulfide resin, polyallylsulfon resin, polysulfon resin, polyethersulfon resin, and polyimide resin.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
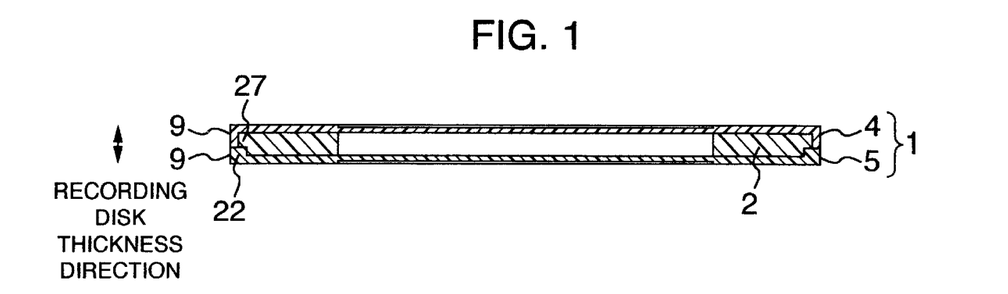
FIG. 1 is a cross-sectional view showing engagement portions of a recording disk cartridge as a first embodiment of the invention.
Figure 2:
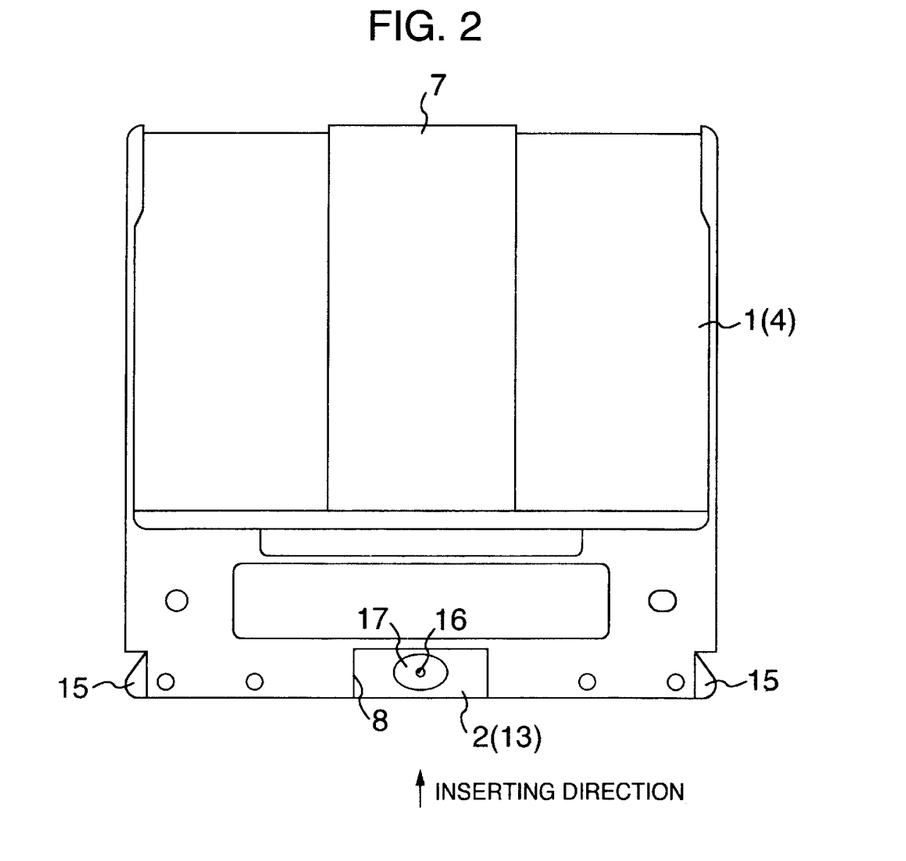
FIG. 2 is a front plane view of the first embodiment.

As shown in FIG. 1, a recording disk cartridge has a cartridge case 1 and a disk holder 2 on which a recording disk 3 can be mounted. The cartridge case 1 is made of a synthetic resin, and a first case part 4 and a second case part 5. The first and second case parts 4 and 5 have respective shapes substantially symmetrical relative to an imaginary plane substantially perpendicular to a recording disk thickness direction. The shape of the first case part 4 is described below.

Figure 3:
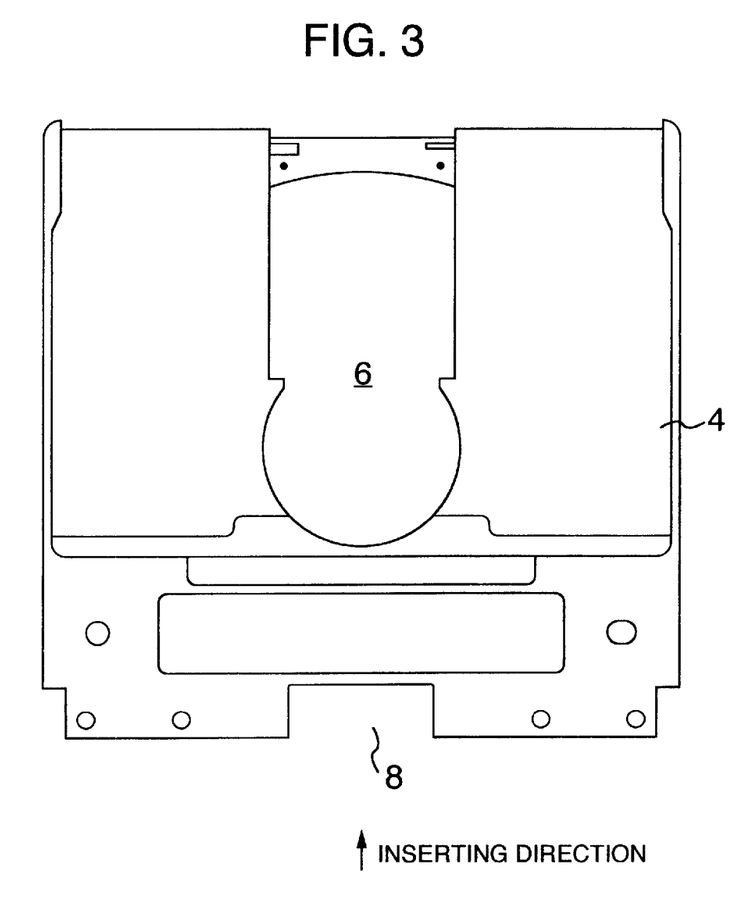
FIG. 3 is a front plane view showing a first part of a cartridge case of the first embodiment.
Figure 4:
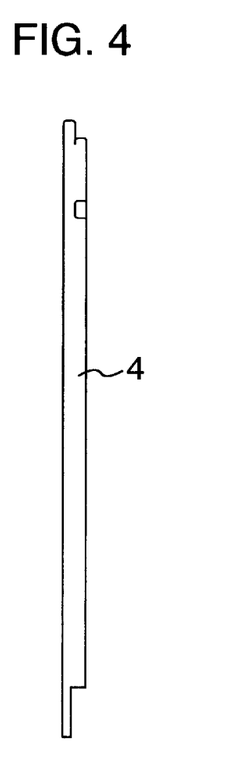
FIG. 4 is a side view showing the first part of the cartridge case of the first embodiment.
Figure 5:
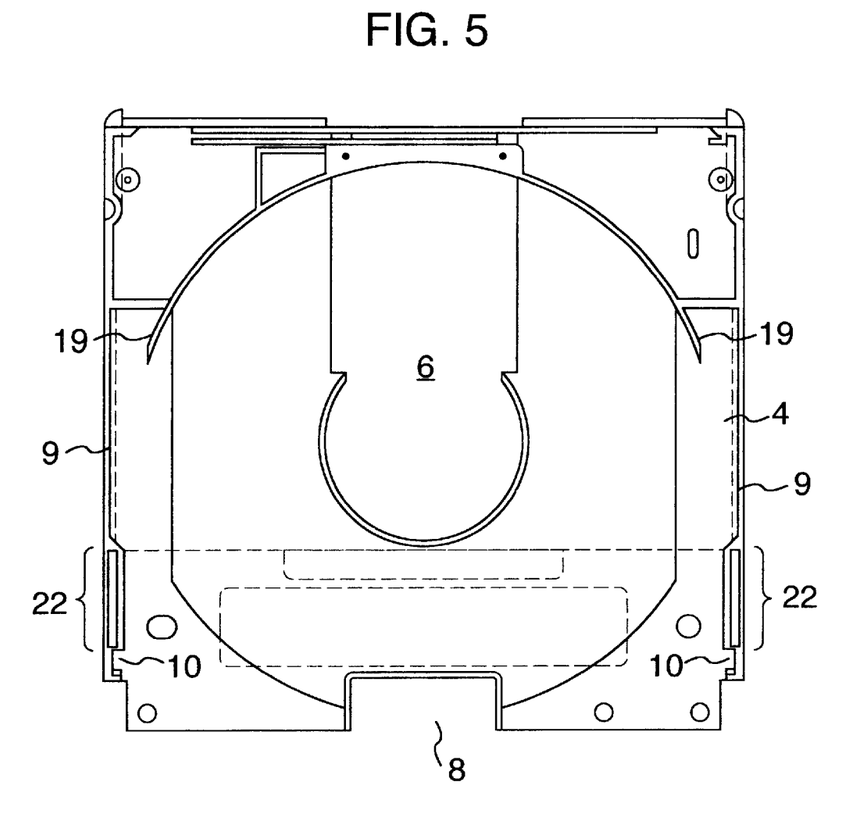
FIG. 5 is a bottom plane view showing the first part of the cartridge case of the first embodiment.
Figure 6:
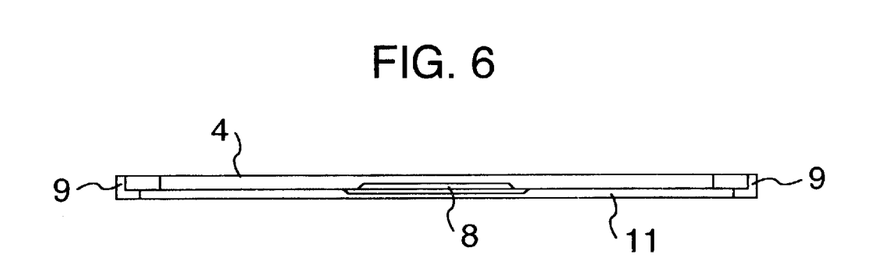
FIG. 6 is another side view showing the first part of the cartridge case of the first embodiment.
Figure 7:
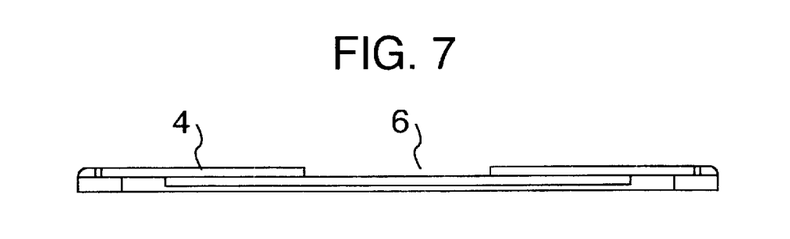
FIG. 7 is the other side view showing the first part of the cartridge case of the first embodiment.

As shown in FIGS. 3 and 5, the first case part 4 has an access opening 6 through which a recording head and a recording disk driving shaft (both not shown) can reach the recording disk 3. The access opening 6 is closed and opened by a moveable shutter 7 urged toward a closing position for the opening 6 by a pair of springs (not shown).

Figure 14:
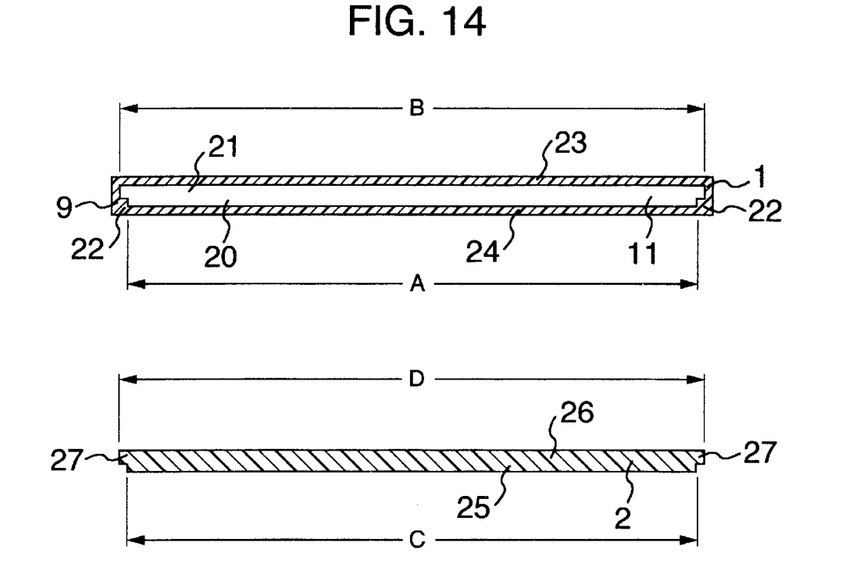
FIG. 14 is a combination of cross-sectional views showing in detail dimensions of engagement portions of the cartridge case and the disk holder of the first embodiment.

The first case part 4 has a dent 8 of a width slightly larger than a finger width. A space for half of a cavity 11 for receiving the disk holder 2 with the recording disk 3 is formed in a side of the dent 8. By assembling the first and second case parts 4 and 5, the cavity 11 is formed as shown in FIG. 14. As shown in FIG. 5, a rock recess 10 is formed on an inner surface of each of side walls 10 facing toward the dent 8.

The disk holder 2 is made of a synthetic resin in which fiber is distributed. The fiber includes at least one selected from a group of glass-fiber, carbon-fiber, boron-fiber and high-rigidity organic fiber. A weight percent of the fiber in the resin is 5–50, and preferably 20–40. If the weight percent is less than 5, an advantageous technical effect of the fiber is not obtained, and if the weight percent is more than 50, a mold forming of the disk holder 2 cannot performed well and a mechanical characteristic, for example, an impact-resistance strength is insufficient.

The synthetic resin includes at least one selected from a group of polyacetal resin, polycarbonate resin, polyamide resin, polyamideimide resin, polyphenylene oxide resin, polyethylene terephthalate resin, polybutylene terephthalate resin, polysulfon resin, polyallylate resin, polyphenylenesulfide resin, polypropylene resin, ABS resin, polyallylsulfon resin, and polypolyethersulfon resin. Particularly, polyamideimide resin, polyamide resin, polyphenylenesulfide resin, polyallylsulfon resin, polysulfon resin, polyethersulfon resin, and polyimide resin has a high anti-creep characteristic or a small stress-relaxation characteristic.

TABLE 1

|  | tensile elasticity | | tensile elasticity coefficient | |
| --- | --- | --- | --- | --- |
|  | non-fiber | fiber-in | non-fiber | fiber-in |
| POM | 6.1 | 12.5 | 3.3 | 8.8 |
| PC | 6.8 | 14.0 | 2.5 | 11.9 |
| PA (nylon 6) | 8.0 | 20.0 | 2.8 | 13.0 |
| PA (nylon 6-6) | 8.4 | 21.0 | 3.1 | 14.0 |
| PPO | 6.7 | 12.0 | 2.5 | 8.4 |
| PET | 6.6 | 14.5 | 2.1 | 11.2 |
| PBT | 5.6 | 13.0 | 2.2 | 10.0 |
| PSF | 7.1 | 13.3 | 2.5 | 10.5 |
| Polyallylate | 8.0 | 13.8 | 2.0 | 6.0 |
| PP | 3.5 | 6.3 | 0.6 | 6.3 |
| ABS | 5.5 | 11.0 | 2.9 | 7.0 |

As shown in Table 1, the fiber in the resin reinforces a mechanical characteristics, for example, tensile strength, and tensile elasticity coefficient.

TABLE 2

|  | Stress relaxation (%) | | |
| --- | --- | --- | --- |
|  | 1 h | 5 h | 15 h |
| PAI | (10) 0.4 | 1 | 2 |
| PA6-6 | (50) 2 | 5 | 8 |
| PPS | (40) 2 | 5 | 9 |
| PASF | (20) 3 | 5 | 10 |
| PSF | (40) 5 | 9 | 14 |
| PESF | (40) 7 | 12 | 16 |
| PI | (30) 7 | 14 | 19 |

† fiber weight percent

As shown in Table 2 obtained under initial stress=175 kg/cm² and environment temperature 23° C., polyamideimide resin, polyamide resin, polyphenylenesulfide resin, polyallylsulfon resin, polysulfon resin, polyethersulfon resin, and polyimide resin has a high anti-creep characteristic or a small stress-relaxation characteristic.

The resin may include, in addition to the fiber, mica, calcium carbinate, wollastonite, glass-beads, talc, aluminum hydroxide or the like.

Each of the resins as described above may form independently a disk holder 2 and/or a cartridge case 1. For example, the disk holder 2 may be made of polyethylene terephthalate resin, polybutylene terephthalate resin, denaturated polyphenylene oxide resin denaturated by styrene or the like as a single (main) synthetic resin material for preventing the disk holder 2 from warping during molding process thereof so that the disk holder 2 can hold securely the recording disk. A plurality of the resins as described above may mixed with each other. For example, a mixture of polycarbonate resin and ABS resin has a high softening point, a high hardness and a high impact-resistance strength. A mixture of ABS resin and polysulfon resin is a low-cost material. A mixture of polyamide resin and elastomer has a high impact-resistance strength. A mixture of polyamide resin and polyphenylenesulfide resin has a high anti-wearing characteristic.

If the disk holder 2 is made of any of the above described materials, it is preferable for the cartridge case 1 to be made of a resin material different from a resin material of which the disk holder 2 is made. When the cartridge case 1 is formed by joining first and second parts, 4 and 5 with each other through ultrasonic welding while the disk holder is arranged between the first and second parts, 4 and 5 of the cartridge case 1, there is a possibility that a welded portion of the parts 4 and 5 adheres to the disk holder 2 to prevent the disk holder 2 from being movable relative to the cartridge case 1. Therefore, the main resin material of the cartridge case 1 is made of a material having melting temperature preferably lower than a melting temperature of the main resin material of the disk holder 2 so that the welded portion of the parts 4 and 5 is restrained from adhering to the disk holder 2. Accordingly, the main resin material of the cartridge case 1 may be styrene-acrylonitrile copolymer (AS) resin, styrene methacrylic-acid copolymer resin, optically transparent ABS resin, polycarbonate resin or the like to keep the welding temperature during the ultrasonic welding less than the melting temperature of the main resin material of the disk holder 2.

The disk holder 2 is made of a high creep-resistance strength material, for example, polyallylate resin or polyacetal resin, and includes a pair of arm-shaped disk holder portions 12 for elastically supporting an outer periphery of the recording disk 3, a holder engagement portion 13 connecting the disk holder portions 12 and fitted in the case engagement portion of the cartridge case 1 as an inlet of the cavity 11, and at least one elastic member 14 arranged on a side of the holder engagement portion 13.

Figures 8, 9:
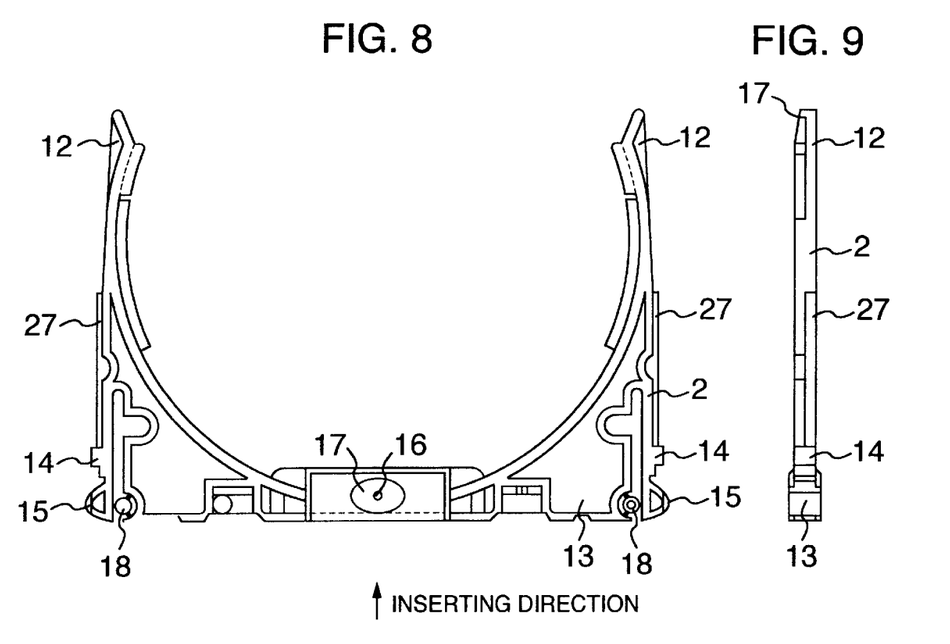
FIG. 8 is a front plane view of a disk holder of the first embodiment.
FIG. 9 is a side view of the disk holder of the first embodiment.
Figure 10:
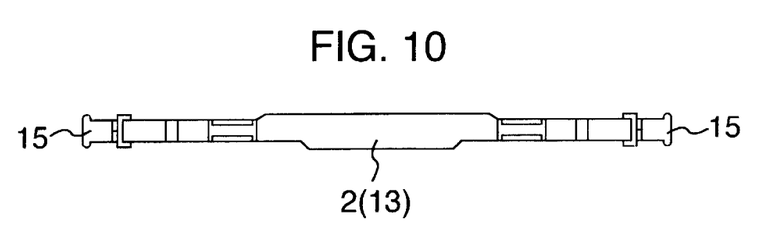
FIG. 10 is a front view of the disk holder of the first embodiment.
Figure 12:
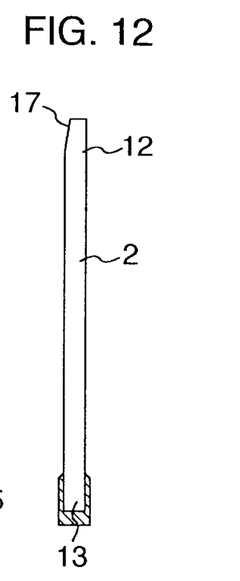
FIG. 12 is a cross-sectional view taken along a line 12—12 in FIG. 11.

As shown in FIGS. 9 and 12, the disk holder portions 12 have respective inclined surfaces 17 for facilitating an insertion of the disk holder 2 into the cartridge case 1. The elastic members 14 have presser portions 15 at respective terminating ends thereof, and stoppers 18 at insides of the presser portions 15. If the disk holder 2 is removable from the cartridge case 1, the stoppers 18 are removed from the disk holder 2 so that the elastic members 14 can freely deform.

By detecting an existence of the stoppers 18, whether or not the disk holder 2 has been removed from the cartridge case 1 can be determined.

Figure 11:
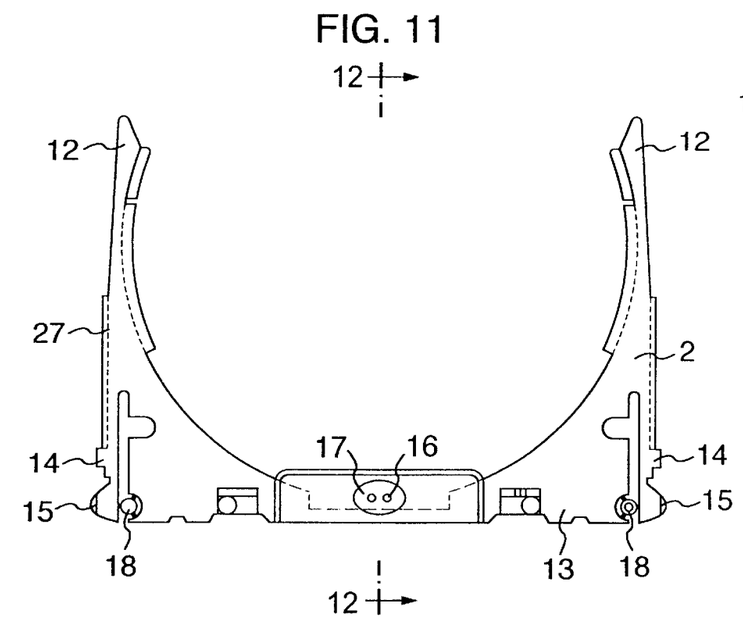
FIG. 11 is a bottom view of the disk holder of the first embodiment.

As shown in FIG. 8, a finger receipt portion 17 with a single projection 16 is formed on a central front area of the holder engagement portion 13, and as shown in FIG. 11, another finger receipt portion 17 with two projections 16 is formed on a central back area of the holder engagement portion 13. For example, a surface of the disk holder 2 having the finger receipt portion 17 with the single projection 16 is named A side, and another surface of the disk holder 2 having the finger receipt portion 17 with the two projections 16 is named B side.

The recording disk 3 is, for example, an optical recording disk of high hardness with two recording surfaces named respectively A side and B side.

Figure 13:
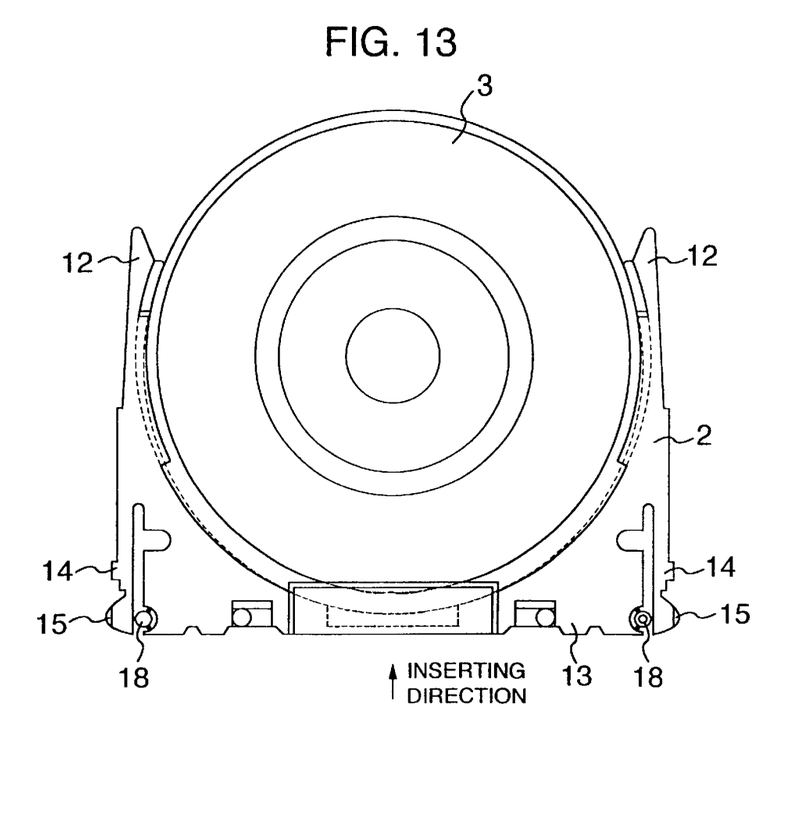
FIG. 13 is a plane view showing a disk held on the disk holder of the first embodiment.

The recording disk 3 is mounted onto the disk holder 2 in such a manner that both of the A side of the disk holder 2 and the A side of the recording disk 2 are visible as seen in the recording disk thickness direction as shown in FIG. 13. The disk holder 2 with the recording disk 3 thereon is mounted into the cavity 11 through the case engage portion of the cartridge case 1.

When the disk holder 2 is sufficiently inserted into the cartridge case 1, a circumferential distance between the arm-shaped disk holder portions 12 is slightly increased by guide projections 19 (as shown in FIG. 5) in the cavity 11 so that the recording disk 3 is released from the disk holder portions 12, and a part of the at least one of the elastic members 14 is fitted into the rock recess 10 so that the disk holder 3 is prevented from being undesirably detached from the cartridge case 1.

An assembly of the cartridge case 1, the disk holder 2 and the recording disk 3 is mounted onto a disk driving device to record information onto the recording disk 3 and read the information from the recording disk 3.

By pressing the presser portions 15 (projecting partially outward from the cartridge case 1) from outside toward inside, the parts of the elastic members 14 are disengaged from into the rock recesses 10 so that the disk holder 2 can be removed from the disk cartridge 1. The recording disk 3 removed from the disk holder 2 may be directly mounted onto the disk driving device or may be mounted onto another of the disk holder 2 to be mounted onto the disk driving device.

As shown in FIG. 14, the case engage portion has a narrow area 20 of a width A confined by case interference portions 22 and a wide area 21 of a width B, and a thickness of side walls 9 (in a direction perpendicular to the recording disk thickness direction and the inserting direction) on which the case interference portion 22 is arranged is larger than a thickness of bridge walls 23 and 24 (in the recording disk thickness direction) connecting the side walls to each other. As shown in FIG. 14, the holder engagement portion has a narrow area 25 of a width C and a wide area 26 of a width D expanded by holder interference portions 27. A relationship among the width A-width D is B>D>A>C. When both positional relationship and attitudinal relationship between the disk holder 2 and the cartridge case 1 as seen in the inserting direction are maintained at their respective desirable situations for enabling the disk holder 2 to be inserted into the cavity 11 in the inserting direction, the case interference portions 22 are not aligned respectively with the holder interference portions 27 and are prevented from interfering with the holder interference portions 27. When the disk holder 2 is reversed so that the attitudinal relationship between the disk holder and the cartridge case is substantially reversed from the desirable situation thereof as seen in the inserting direction and the positional relationship between the disk holder and the cartridge case is maintained at the desirable situation thereof as seen in the inserting direction, the case interference portions 22 are aligned respectively with the holder interference portions 27 and interfere with the holder interference portions 27 so that the disk holder 2 is prevented from being inserted into the cavity 11 in the inserting direction by a interference between the case interference portions 22 and the holder interference portions 27.

Figure 15:
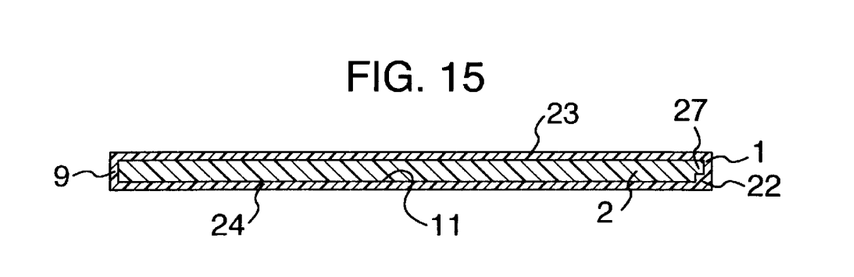
FIG. 15 is a cross sectional view showing an engagement portion of a cartridge case as a second embodiment of the invention.

As shown in FIG. 15, the case interference portion 22 may be arranged on one of the side walls 9, and the holder interference portion 27 may be arranged to face to one of the side walls 9.

Figure 16:
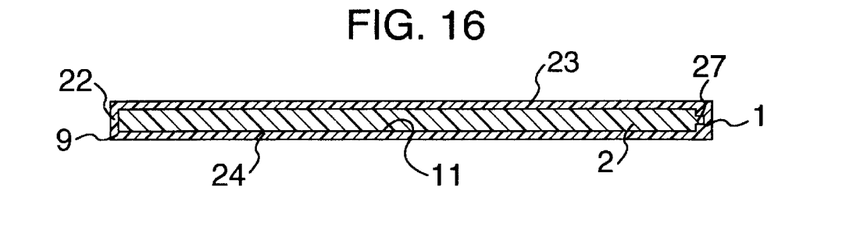
FIG. 16 is a cross sectional view showing an engagement portion of a cartridge case as a third embodiment of the invention.

As shown in FIG. 16, when the holder interference portion 27 is arranged to face to one of the side walls 9, and the case interference portion 22 is arranged on another one of the side walls opposite to the one of the side walls 9.

Figure 17:
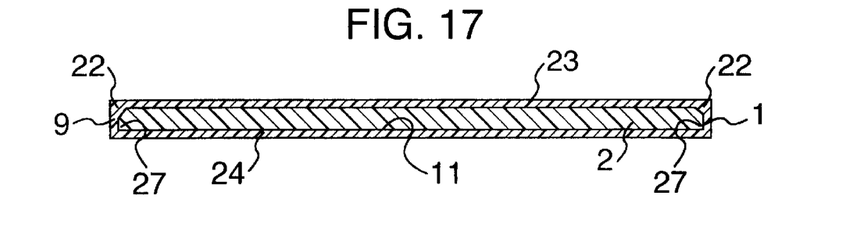
FIG. 17 is a cross sectional view showing an engagement portion of a cartridge case as a fourth embodiment of the invention.

As shown in FIG. 17, the case interference portion 22 as a protrusion filling a corner space of the cavity 11 may be arranged on at least one of the side walls 9, and the holder interference portion 27 as a projecting corner may be arranged to face to the at least one of the side walls 9.

Figure 18:
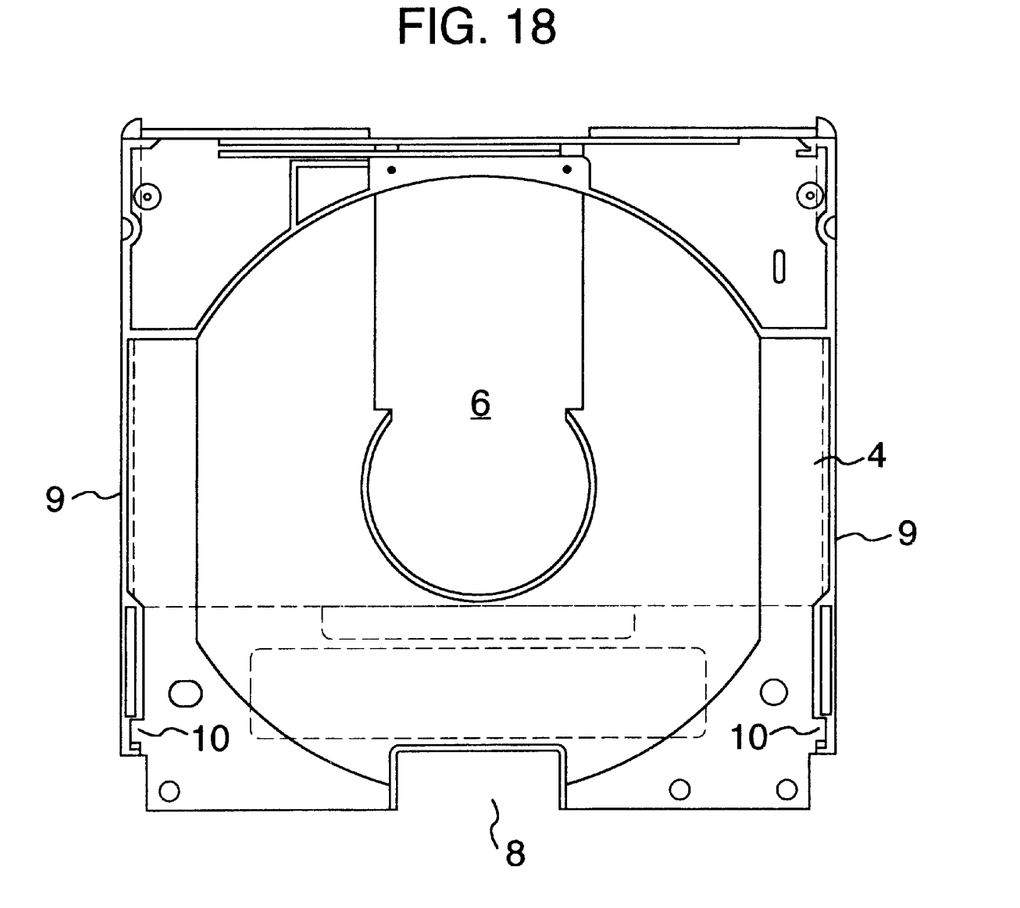
FIG. 18 is a bottom view showing a first part of a cartridge case as a fifth embodiment of the invention.
Figure 19:
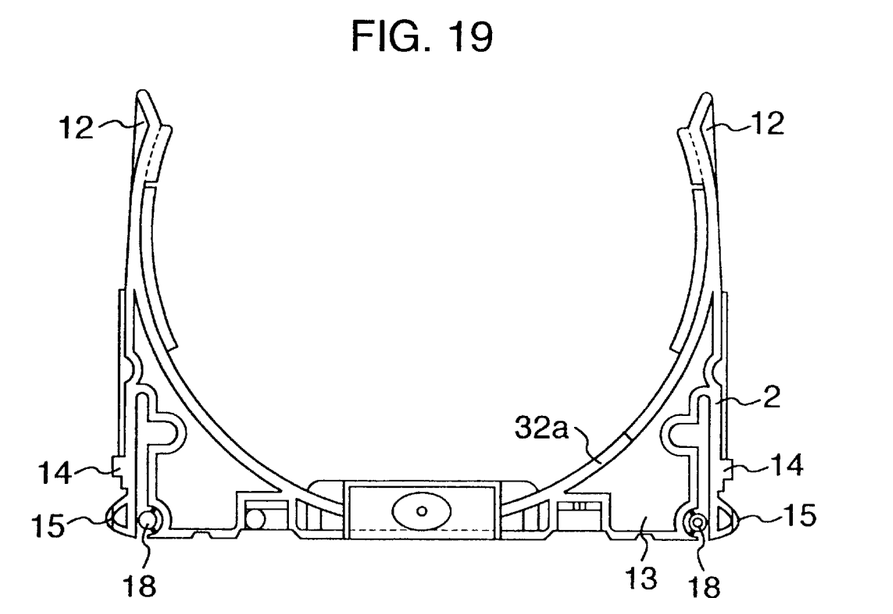
FIG. 19 is a front plane view showing a disk holder.
Figure 20:
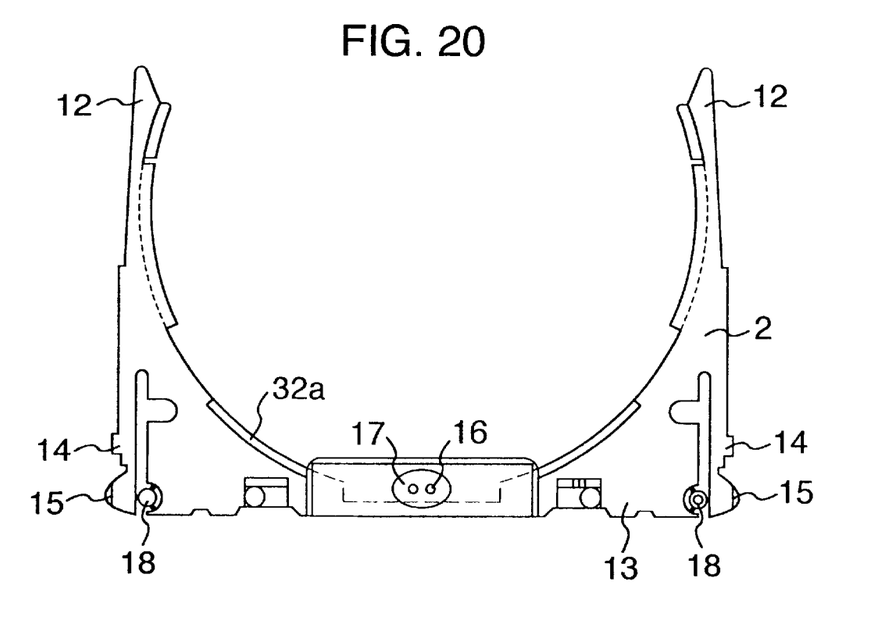
FIG. 20 is a bottom plane view showing the disk holder of FIG. 19.
Figure 21:
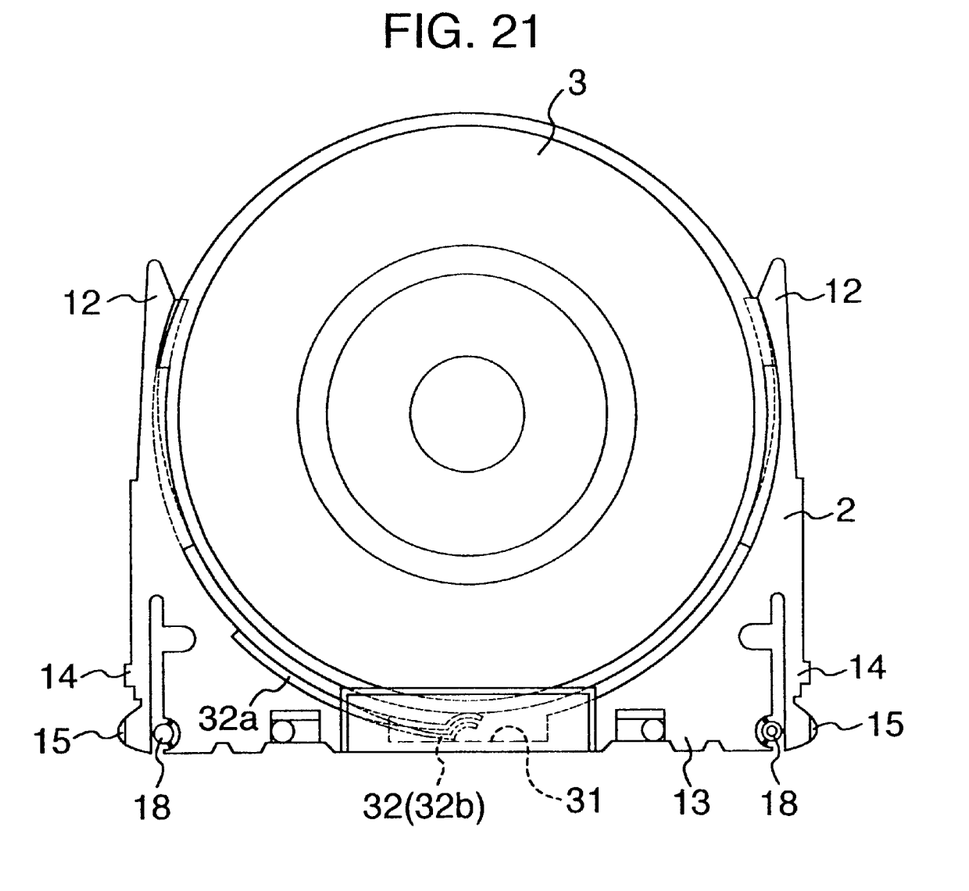
FIG. 21 is a plane view showing a recording disk on the disk holder of FIGS. 19 and 20.

A cartridge case 1 (only a first part 4 thereof is shown in FIG. 18) does not have the guide projections 19. As shown in FIG. 21, the recording disk 3 is supported on three contact points on the disk holder 2, wherein two of the three contact points are formed on the disk holder portions 12, and one of the three contact points in a space 31 of the disk holder 2 is formed on a free end 32b of a plate spring 32 of cantilever whose root portion 32a is fixed on the holder engagement portion 13 by screw means, insert molding or welding. An elastic force of the plate spring 32 urges the recording disk 3 toward the disk holder portions 12.

Figure 22:
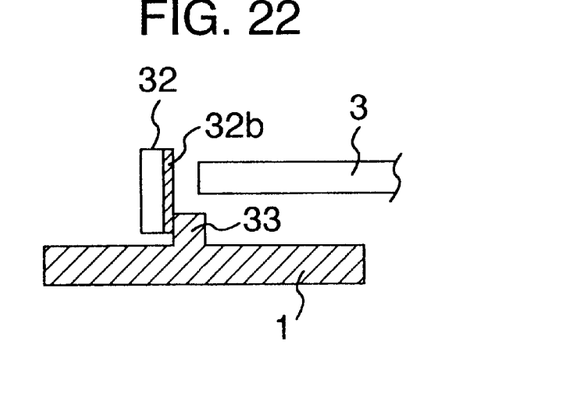
FIG. 22 is a partially cross sectional view showing a mechanism for releasing a recording disk urging force.

When the disk holder 2 is not inserted sufficiently deeply into the cavity 11, the recording disk 3 is kept on the three contact points by the elastic force of the plate spring 32 as shown by a dot line in FIG. 21. When the disk holder 2 is inserted sufficiently deeply into the cavity 11, the free end 32b is retained by a spring release projection 33 of the cartridge case 1 as shown in FIG. 22 and thereby separated away from the outer periphery of the recording disk 3 as shown by an alternate long and two short dashes line in FIG. 21 so that the recording disk 3 is not urged toward the two of the three contact points and is freely rotatable on the disk holder 2. After the disk holder 2 is inserted to such a position that the recording disk 3 is rotatable on the disk holder 2, an engagement between the parts of the elastic members 14 and the rock recesses 10 prevents the disk holder 3 from being undesirably detached or drawn out from the cartridge case 1 so that a separation between the free end 32b and the outer periphery of the recording disk 3 is maintained.

In a case that the disk holder 2 is mounted into an adapter, and the adapter is mounted into the cartridge case 1, the spring release projection for separating or releasing the free end 32b from the outer periphery of the recording disk 3 is formed on the adapter.

Figure 23:
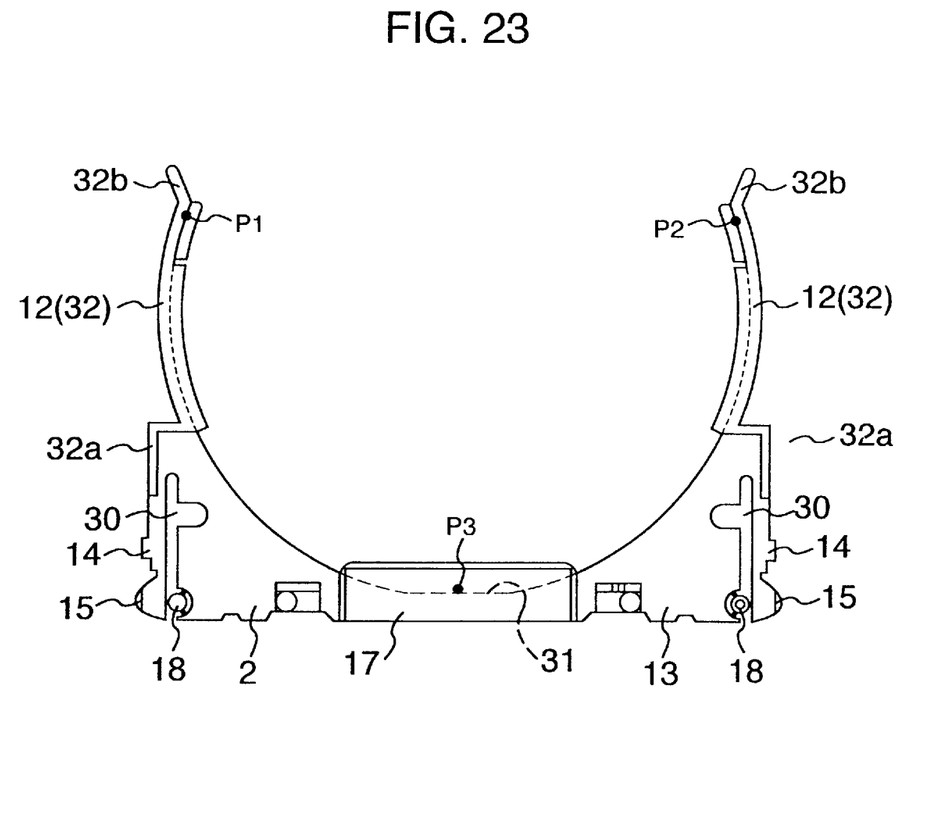
FIG. 23 is a bottom view showing a first part of a cartridge case as a sixth embodiment of the invention.

As shown in FIG. 23, at least one of the disk holder portions 12 may be formed by the plate spring 32 whose root portions 32a is fixed on the holder engagement portion 13 by screw means, insert molding or welding. The free ends 32b are bent to be directed radially outward relative to a center of the recording disk 3. The recording disk 3 is supported elastically on the disk holder 3 through three contact points P1, P2 and P3 when the disk holder 2 is not sufficiently inserted into the cartridge case 1. Two of the contact points P1 and p2 are arranged on the free ends 32b, and one of them is arranged in the space 31. When the disk holder 2 is sufficiently inserted into the cartridge case 1, a circumferential distance between the contact points P1 and P2 of the free ends 32b is slightly increased by the guide projections 19 of the first case part 4 (as shown in FIG. 5) so that the recording disk 3 is freely rotatable. The plate spring 32 may be replaced by a coil spring which may include a contact member (made of, for example, woven cloth, non-wovencloth, felt or the like) through which the coil spring contacts the outer periphery of the recording disk 3.

The contact member may be arranged on the free end 32b of the plate spring 32.

Figure 24:
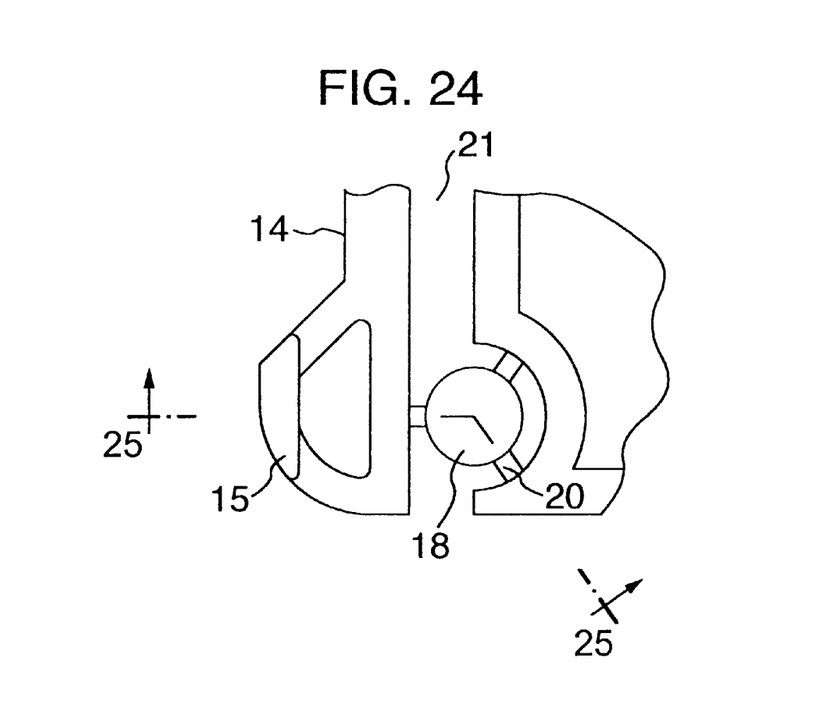
FIG. 24 is an enlarged view showing a stopper of a disk holder as a seventh embodiment of the invention.
Figure 25:
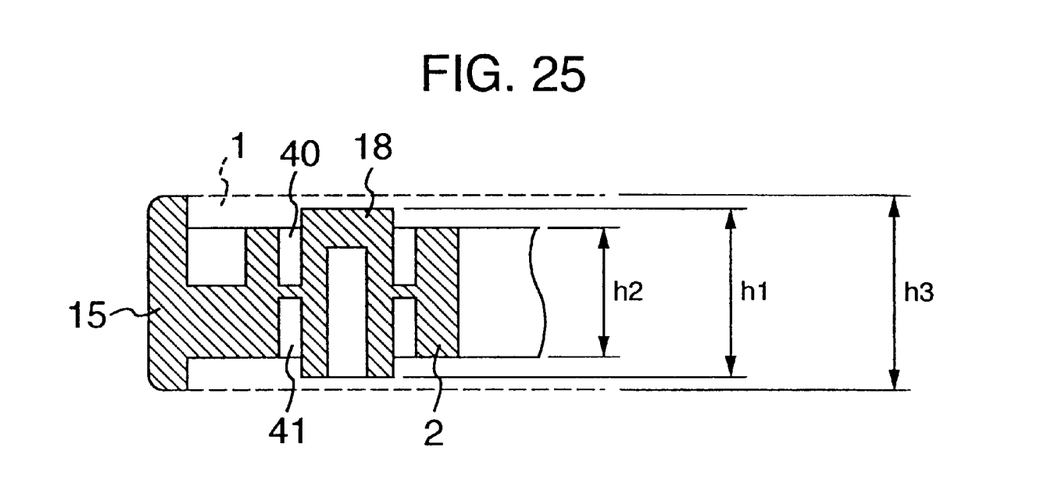
FIG. 25 is a cross sectional view taken along a line 25—25 in FIG. 24.

As shown in FIGS. 24 and 25, the stoppers 18 are formed monolithically with the disk holder 2 through a thin portion 40. A height h1 of the stoppers is larger than a depth h2 of grooves 41 so that an undesirable inclination of the stoppers in the grooves 41 is restrained for smooth removal of the stoppers from the grooves 41. The height h1 of the stoppers is not less than a height h3 of the cartridge case 1 so that ends of the stoppers 18 are prevented from projecting from any of surfaces of the cartridge case 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording disk cartridge for containing therein a recording disk, comprising:

a disk holder adapted to hold therein a recording disk, said disk holder having two side surfaces extending parallel to an inserting direction;

a cartridge case for containing therein the disk holder, said cartridge case having side walls and bridge walls forming a cavity into which the disk holder is capable of being inserted in the inserting direction;

said cartridge case has a case interference portion, said case interference portion being formed on an inner side of at least one of the side walls and the bridge walls of the cartridge case; and said disk holder has a disk holder interference portion, said disk holder interference portion being formed on at least one of said two side surfaces, and said disk holder interference portion extending in the inserting direction, said disk holder interference portion being a protrusion protuding in a direction perpendicular to a thickness direction of the recording disk as seen in the inserting direction wherein said case interference portion and said disk holder interference portion prevent an undesirable insertion of the disk holder into the cavity of the cartridge case when the disk holder is being inserted into the cavity.

2. The recording disk cartridge according to claim 1, wherein the cartridge case includes first and second sides juxtaposed with each other along an imaginary plane perpendicular to a thickness direction of the recording disk as seen in the inserting direction, and the case interference portion is formed on at least one of the first and second sides.

3. The recording disk cartridge according to claim 1, wherein the disk holder includes first and second sides juxtaposed with each other along an imaginary plane perpendicular to a thickness direction of the recording disk as seen in the inserting direction, and the holder interference portion is formed on at least one of the first and second sides.

4. The recording disk cartridge according to claim 1, wherein the cartridge case includes said side walls extending in a thickness direction of the recording disk as seen in the inserting direction, and said bridge walls bridging the side walls in a direction perpendicular to the thickness direction as seen in the inserting direction to form the cavity, and a thickness of each of the side walls at a location away from the interference portion is larger than that of each of the bridge walls as seen in the inserting direction.

5. The recording disk cartridge according to claim 1, wherein the case interference portion is a protrusion protruding into the cavity as seen in the inserting direction.

6. The recording disk cartridge according to claim 1, wherein the protrusion is stair-shaped.

7. The recording disk cartridge according to claim 1, wherein said disk holder interference portion extends in the inserting direction more than in the non-inserting direction.

8. The recording disk cartridge according to claim 1, wherein said case interference portion is formed on at least one of said side walls.

9. The recording disk cartridge according to claim 1, wherein said case interference portion projects into the cavity formed by said side walls and said bridge walls of said cartridge case.

* * * * *